US006317491B1

United States Patent
Chang et al.

(10) Patent No.: US 6,317,491 B1
(45) Date of Patent: Nov. 13, 2001

(54) METHOD AND APPARATUS FOR AN INTELLIGENT TELECOMMUNICATION BASE UNIT AND A DETACHABLE MOBILE INFORMATION UNIT

(75) Inventors: Jackson C. S. Chang, Taipei (TW); Feng Zhang, Shanghai (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/067,760

(22) Filed: Apr. 27, 1998

(51) Int. Cl.[7] ............................. H04M 1/56; H04M 15/06
(52) U.S. Cl. ................... 379/142.01; 379/142.17; 379/142.05; 455/415; 455/566
(58) Field of Search ................ 379/88.19–88.21, 379/93.23, 120, 127, 133–134, 113–114, 142, 354; 455/566–567, 414–415

(56) References Cited

U.S. PATENT DOCUMENTS 5,572,576 * 11/1996 Klausner et al. ..................... 379/67
5,581,599 * 12/1996 Tsuji et al. ........................... 455/415
5,940,485 * 8/1999 Sapra et al. .......................... 379/142

* cited by examiner

Primary Examiner—Duc Nguyen
(74) Attorney, Agent, or Firm—Chien-Wei Chou; Oppenheimer Wolff & Donnelly LLP

(57) ABSTRACT

A telecommunication base unit and a mobile information unit combination is disclosed. The base unit includes circuitry for receiving an incoming telephone call, a caller identification circuit, an on-line/off-line control circuit, a dial circuit, an optional LCD display, and an optional keypad on the base unit. It further includes storage area for storing a copy of the information in the mobile information unit and for logging caller identification information and messages. The base unit provides a connector cradle designed to receive and communicate with the mobile information unit. Additionally, the base unit can be connected to a keyboard for carrying out entering and editing functions. Other external connectors are provided for optionally connecting to other devices, including a personal computer and printer. The mobile information unit stores a variety of information and it has the ability to upload information and/or synchronize information with the base unit. A security feature is provided for the mobile information unit and the base unit so that information is maintained in a confidential manner.

16 Claims, 8 Drawing Sheets

METHOD AND APPARATUS FOR AN INTELLIGENT TELECOMMUNICATION BASE UNIT AND A DETACHABLE MOBILE INFORMATION UNIT

FIELD OF THE INVENTION

The present invention generally relates to a mobile personal information unit and a base unit for storing and synchronizing data between the two units, and, in particular, to a mobile personal information unit and a base unit where the base unit receives incoming phone calls, logs caller identification information in a confidential manner, and passes the caller identification information to the mobile information unit.

BACKGROUND OF THE INVENTION

A modern day caller identification device typically is a unit with a LCD display disposed between the incoming phone line and the telephone device. While this is a simple and workable configuration and serves as a basic caller identification device, it has limited capabilities and it does not maintain confidentiality of the caller. Additionally, this type of device does not offer any additional features beyond simple caller identification function. In the traditional mobile information unit such as a personal digital assistant (PDA), information is entered via an input device such as a keyboard or a touch screen. However, this type of mobile information unit typically does not have the capability to back-up its data or, even if there is a method for backing up the data, the back-up method would be tedious and/or expensive. For example, currently there is a mobile information unit that is insertable into a cradle where the cradle is connected to a personal computer. The data in the mobile information unit can be readily stored in the personal computer via the cradle. However, this is an expensive arrangement considering the fact that the mobile information unit and the cradle is designed to communicate with a personal computer. A user of this mobile information unit would need a personal computer and the necessary expertise in backing up the data stored in the mobile information unit. Thus, there has to be a substantial hardware investment and the necessary software expertise before this arrangement is feasible.

Therefore, it would be desirable to have an inexpensive device that can readily back-up the data contained in a mobile information unit and maintain confidentially of the data stored in the mobile information unit or in the base unit. Additionally it will be desirable to have a device for receiving phone calls, logging caller identification information and messages, and offers the ability to readily uploaded the information and messages into the mobile information unit.

SUMMARY OF THE INVENTION

It is therefore an object of the present invention to provide a method and apparatus for a telecommunication base unit for receiving telephone calls and logging caller identification information and messages.

It is another object of the present invention to provide a method and apparatus for a telecommunication base unit and a mobile information unit that can maintain information in a confidential manner.

It is yet another object of the present invention to provide a method and apparatus for a base unit that can readily connect to a mobile information unit and backup information stored in the mobile information unit.

It is still another object of the present invention to provide a method and apparatus for readily uploading received caller identification information and messages into the mobile information unit.

Briefly the present invention provides for a telecommunication base unit and a mobile information unit combination. The base unit includes circuitry for receiving an incoming telephone call, a caller identification circuit, an on-line/off-line control circuit, a dial circuit, an optional LCD display, and an optional keypad on the base unit. It further includes a storage area for storing a copy of the information in the mobile information unit and for logging caller identification information and messages. The base unit provides a connector cradle designed to receive and communicate with the mobile information unit. Additionally, the base unit can be connected to a keyboard for carrying out entering and editing functions. Other external connectors are provided for optionally connecting to other devices, including a personal computer and printer. The mobile information unit stores a variety of information and it has the ability to upload information and/or synchronize information with the base unit. A security feature is provided for the mobile information unit and the base unit so that information is maintained in a confidential manner.

An advantage of the present invention is that it provides a method and apparatus for a telecommunication base unit for receiving telephone calls and logging caller identification information and messages.

Another advantage of the present invention is that it provides a method and apparatus for a telecommunication base unit and a mobile information unit that can maintain information in a confidential manner.

Yet another advantage of the present invention is that it provides a method and apparatus for a base unit that can readily connect to a mobile information unit and backup information stored in the mobile information unit.

Still another advantage of the present invention is that it provides a method and apparatus for readily uploading caller identification information and messages into a mobile information unit.

These and other features and advantages of the present invention will become well understood upon examining the figures and reading the following detailed description of the invention.

DRAWINGS

DETAILED DESCRIPTION OF THE PREFERRED EMBODIMENTS

Figure 1:
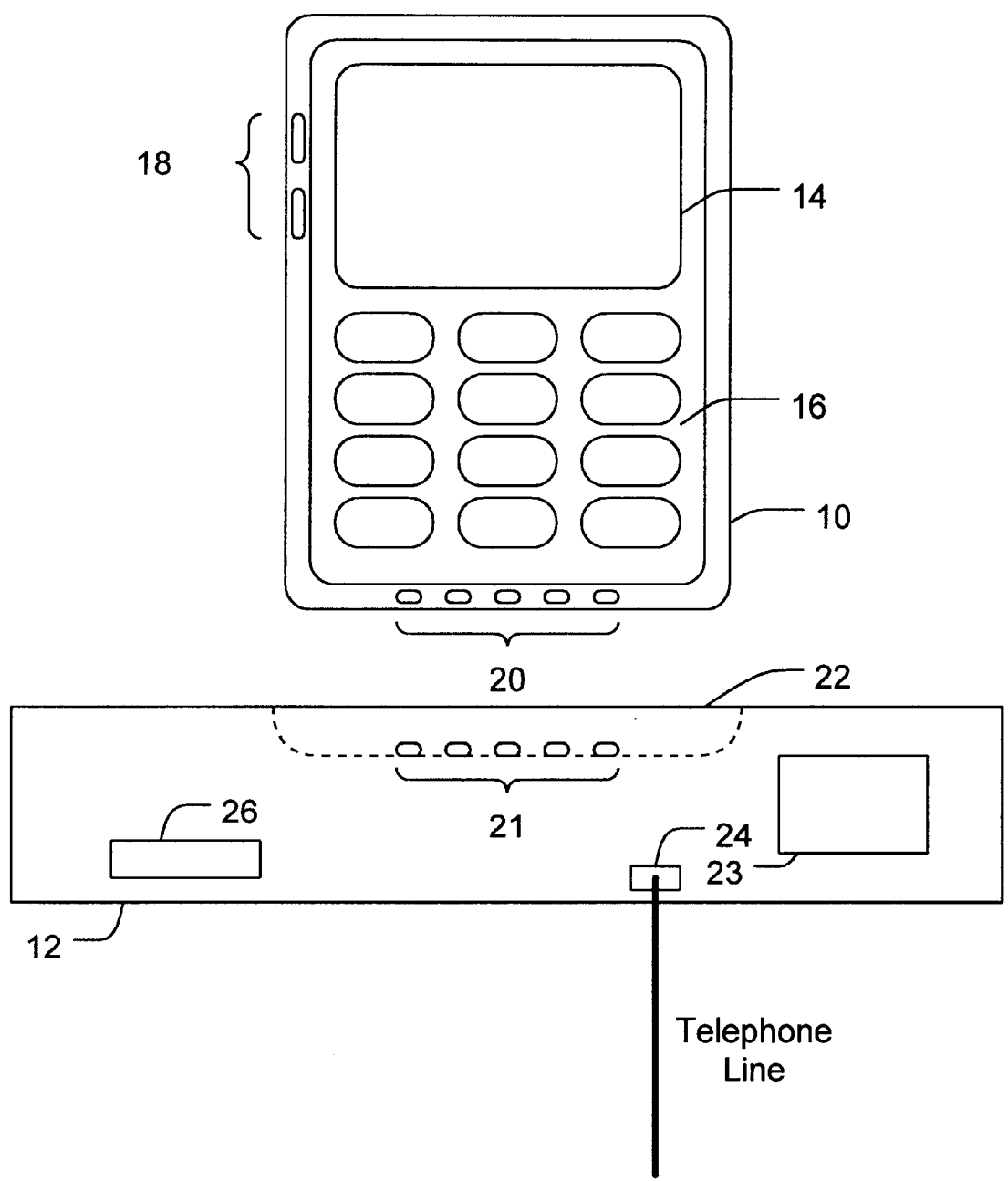
FIG. 1 illustrates a mobile information unit and a telecommunication base unit combination.

Referring to FIG. 1, a presently preferred embodiment of the present invention comprises a mobile information unit 10 and a telecommunication base unit 12. The mobile information unit comprises a LCD display 14, a keypad 16 having a number of buttons for operating the mobile information unit, and a plurality of contact points 20 for communication with the base unit 12. The brightness of the LCD display 14 can be controlled via a couple of buttons 18 on the side of the mobile information unit 10. The plurality of contact points 20 is provided for communication with the base unit 12 when the mobile information unit 10 is inserted into a cradle 22 in the base unit 12. The base unit 12 includes the cradle 22 for receiving the mobile information unit, a plurality of contact points 21 in the cradle 22 for establishing a communication link with the mobile information unit 10, a receptacle for collecting to a telephone line for receiving incoming telephone calls 24, and external ports 26 for connection to other devices such as a keyboard or a serial port, parallel port, etc. A power switch 23 may be provided on the base unit.

Figure 2:
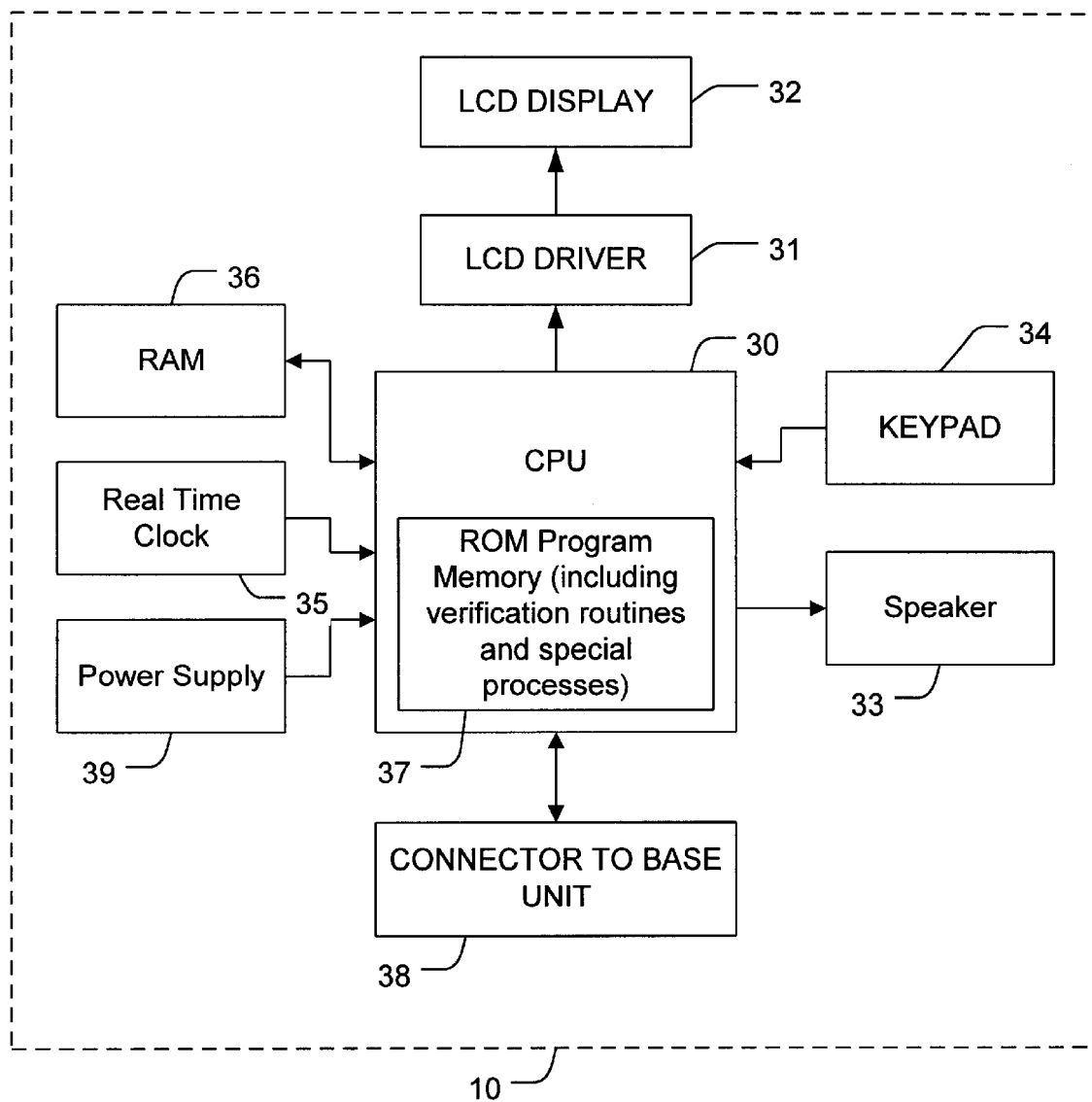
FIG. 2 illustrates a function block diagram for the mobile information unit.

FIG. 2 illustrates an embodiment of the mobile information unit. The mobile information unit comprises a central processing unit 30 (which may have a built-in ROM storage unit 37), that communicates directly or via a bus to a LCD driver 31 to a LCD display 32, a keypad 34, a storage unit 36 (RAM or other types), a speaker 33, a real time clock 35, a power supply or source 39, and a connector 38 having a plurality of contact points for establishing a connection with the cradle of the base unit. The CPU 30 upon power-up executes initialization programs stored in the ROM storage unit 37 which can be within the CPU unit. After initialization, the CPU responses to the input keystrokes received from the keypad 34 and processes the information accordingly. The CPU 30 would be able to process a number of programs as provided in the storage unit, including a phone book program, a scheduling program, a task list program, a word processing program, etc. The storage unit 36, which can be in the form of ROM, RAM, or other storage types, stores both programs and data for the mobile information unit. The LCD display 32 shows information as directed by the CPU. The connection to the connector 38 provides a pathway for the mobile information unit to communicate with the base unit when a connection is made. In an alternative embodiment, the keypad can be eliminated or replaced in favor of a touch-screen.

Figure 3:
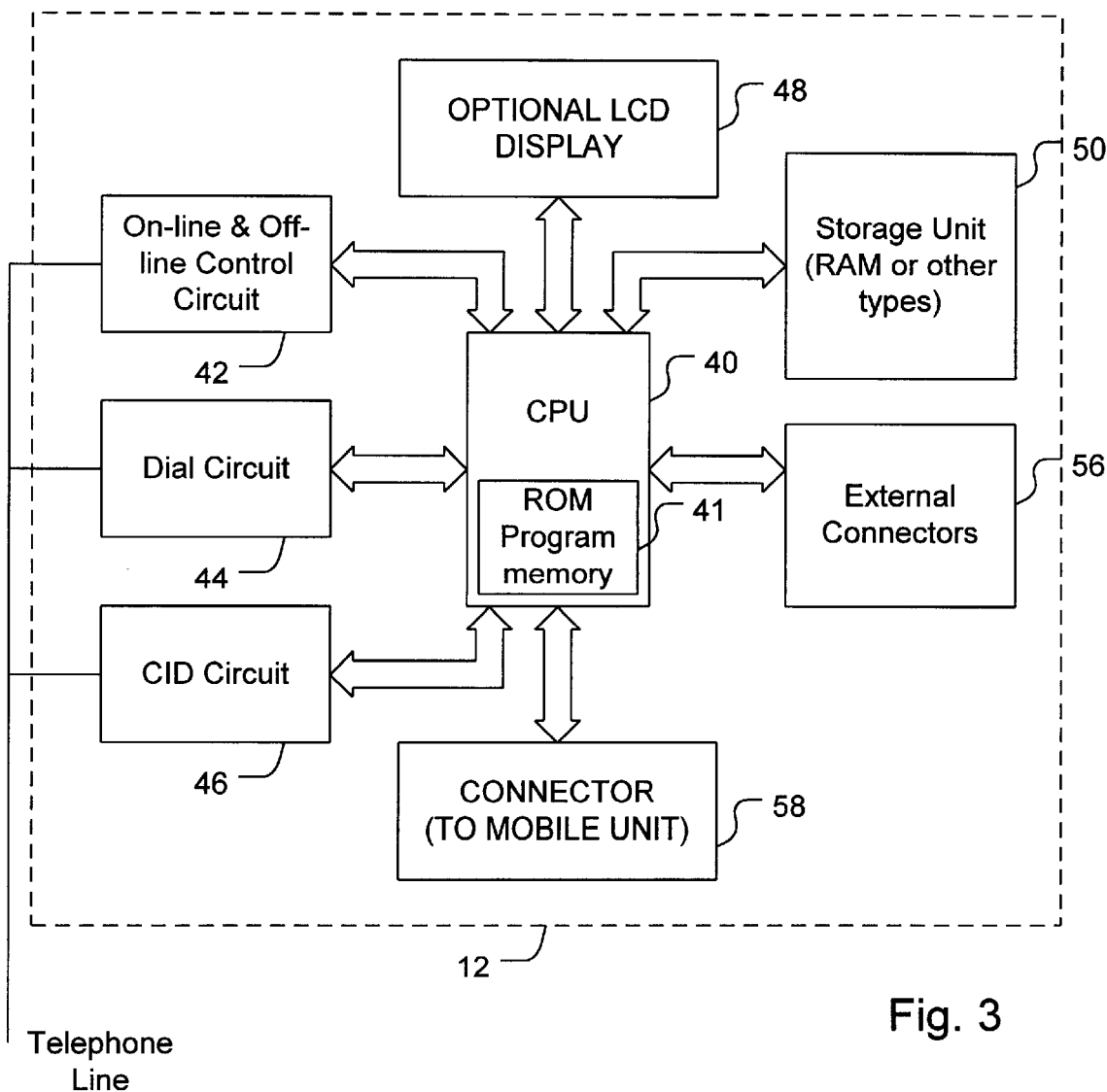
FIG. 3 illustrates a function block diagram for the telecommunication base unit.

FIG. 3 illustrates an embodiment of the base unit of the present invention. The base unit contains a CPU 40 (which may have built-in ROM memory storage 41), which communicates with a number of circuits including an on-line/off-line control circuit 42 for controlling the state of the telephone line, a dial circuit 44 for dialing out of the telephone line, a caller identification (CID) circuit 46 for identifying caller identification information embedded in the incoming call, an optional LCD display 48 for displaying information as provided by the CPU, a storage unit 50 for storing both command and data including an area for backing-up information from the mobile information unit, and an area for storing recently received caller identification information and messages. The base unit can be connected to a keyboard via an external connector 56 or other types of connectors. Finally, the CPU communicates with a base unit connector 58 designed to provide the necessary contact point for communication with the mobile information unit.

In operation. the CID circuit 46 detects and decodes the caller identification signal embedded in an incoming call and passes the decoded information to the CPU for processing and/or storage. The on-line/off-line control circuit 42 and the dial circuit 44 are provided to allow dialing capability from a selected phone book entry. In this manner, the base unit (either with or without the mobile information unit) becomes a full-function phone device having all the phone numbers readily available for dialing. The LCD display 48 on the base unit is optional. If it is provided, it can be programmed to turn on when the correct password is provided.

Figure 4:
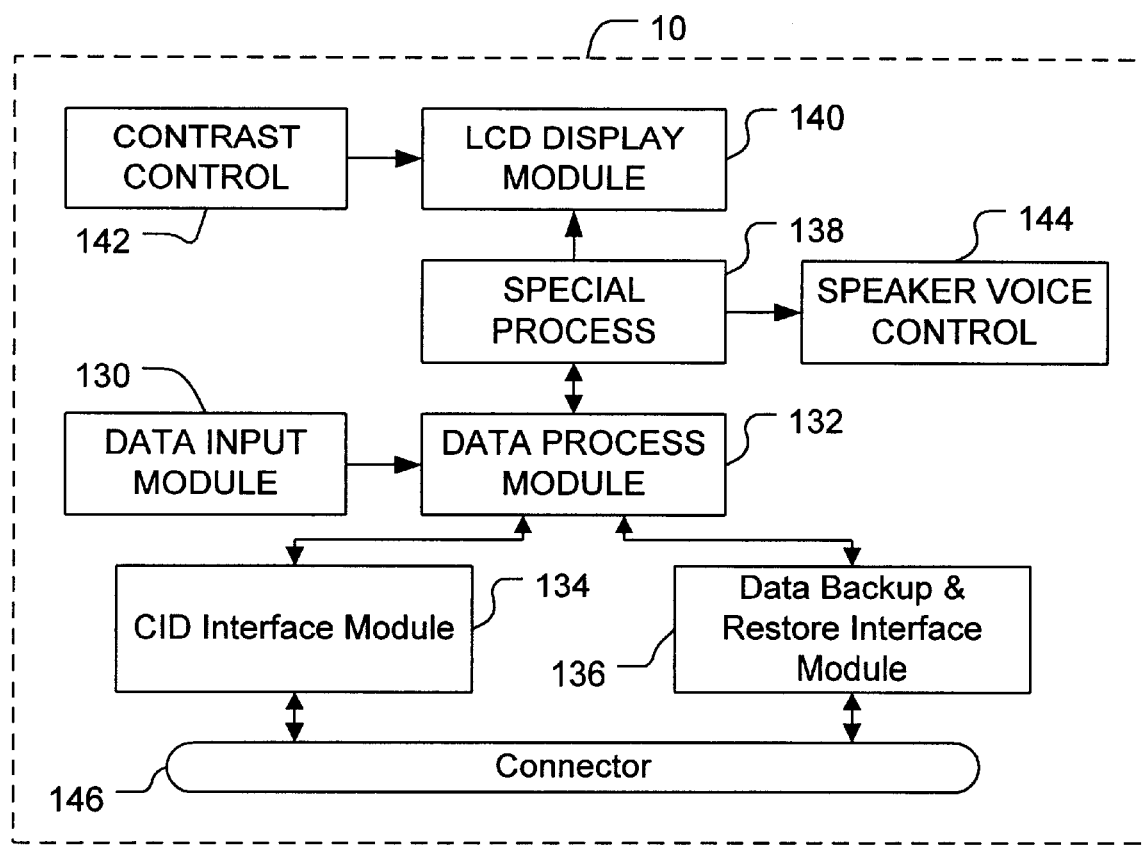
FIG. 4 illustrates software modules contained in the mobile unit and the base unit.
Figure 4:
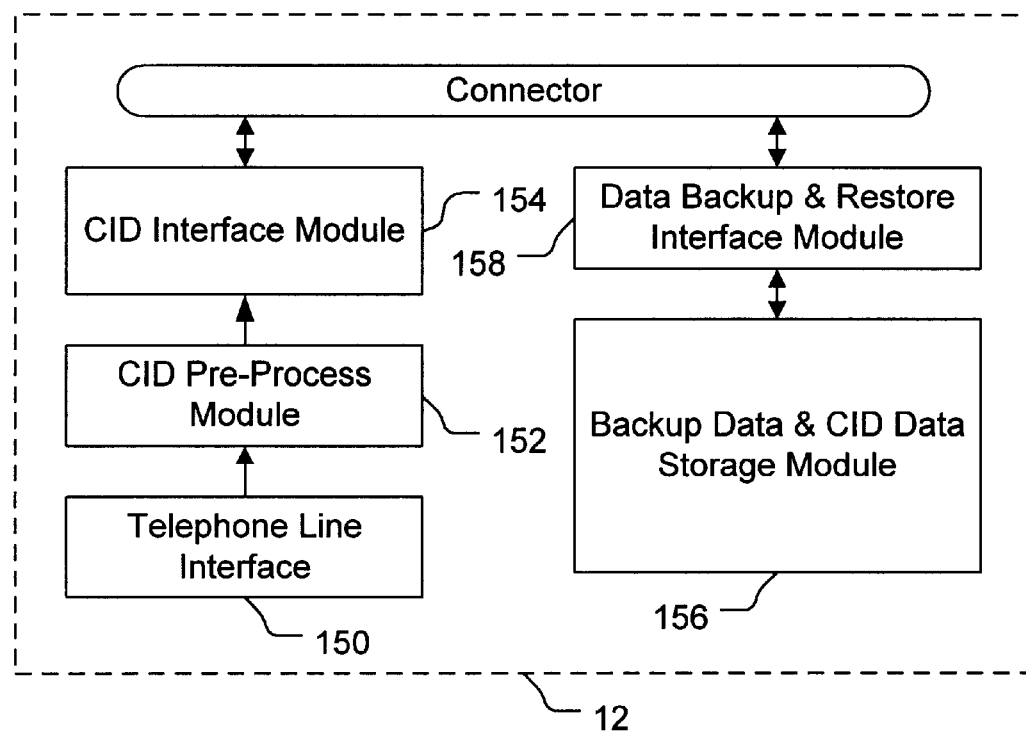

FIG. 4 illustrates some of the software modules contained in the mobile unit 10 and the base unit 12. In the mobile unit 10, there is a data input module 130 for handling data entered from the keypad or other input devices to the mobile unit. A data processing module 132 receives data from the data input module 130, the CID interface module 134 and a data backup and restore interface module 136. Data may be passed between the data processing module 132 and a special processing module 138 and can be displayed on a LCD display through a LCD display module 140. The contrast of the LCD display can be adjusted by a contrast control module 142. There is also a speaker control module 144 affected by the special processing module 138. The CID interface module 134 and the data backup and restore interface module 136 are connected to the connector 146 for receiving data from the base unit 12. Security check and data verification operations can be performed by the interface modules.

The base unit 12 contains a number of other software modules. A telephone line interface module 150 operates the phone line and receives data from the line. The data is pre-processed and packaged by a CID pre-processing module 152 to extract CID information and other information from the incoming calls. The data is then sent to a CID interface module 154 to be forwarded to the mobile unit. The base unit 12 also contains software modules for backing up the data stored in the mobile unit. There is a backup data and CID data storage module 156 and a data backup and restore interface module 158. Through the interface modules, data can be passed through the connector to the mobile unit 10.

Figure 5:
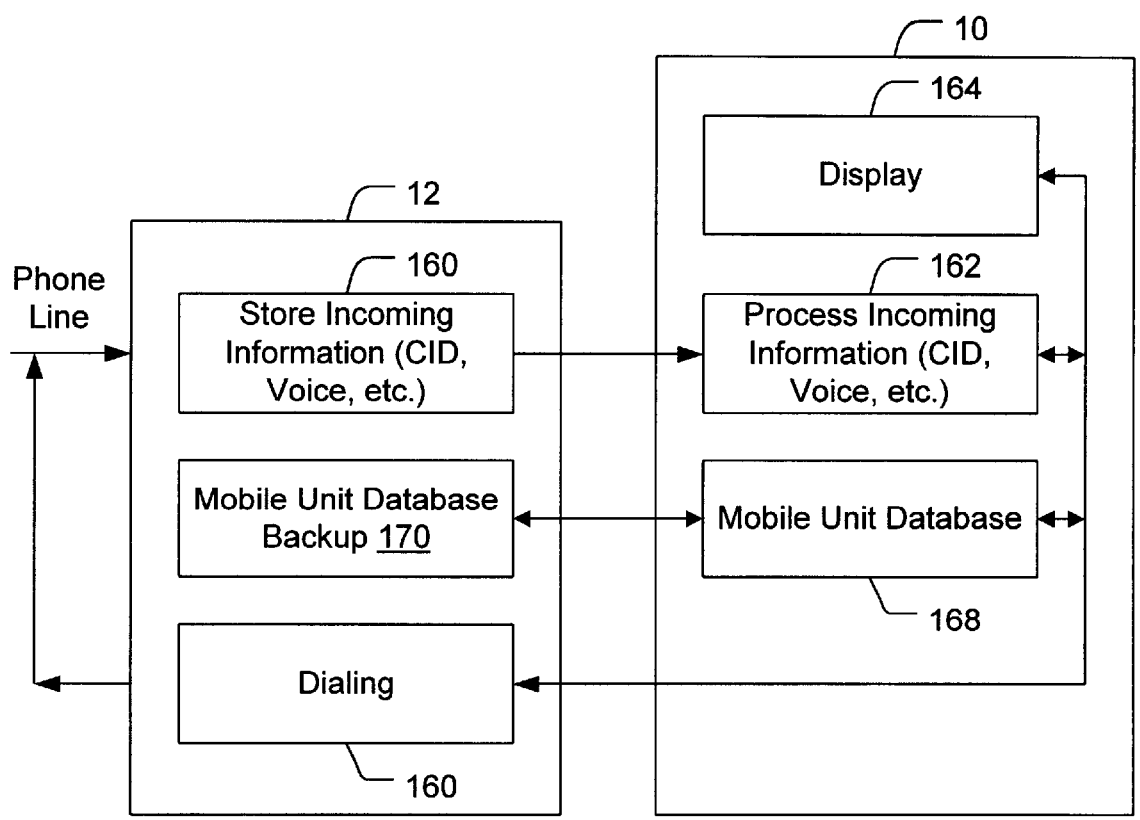
FIG. 5 illustrates a software processing flow diagram between the mobile unit 10 and the base unit 12.

FIG. 5 illustrates a software processing flow diagram between the mobile unit 10 and the base unit 12. Information is received via the phone line by the base unit 12 and is stored 160 and is only pre-processed. Processing of the raw data 162 is performed by the mobile unit when the data is delivered to the mobile unit. Information can be displayed by the mobile unit on its display 164 or dialed out 166 when the mobile unit is communicating with the base unit. Database on the mobile unit 168 can be backup on the base unit 170.

Figure 6:
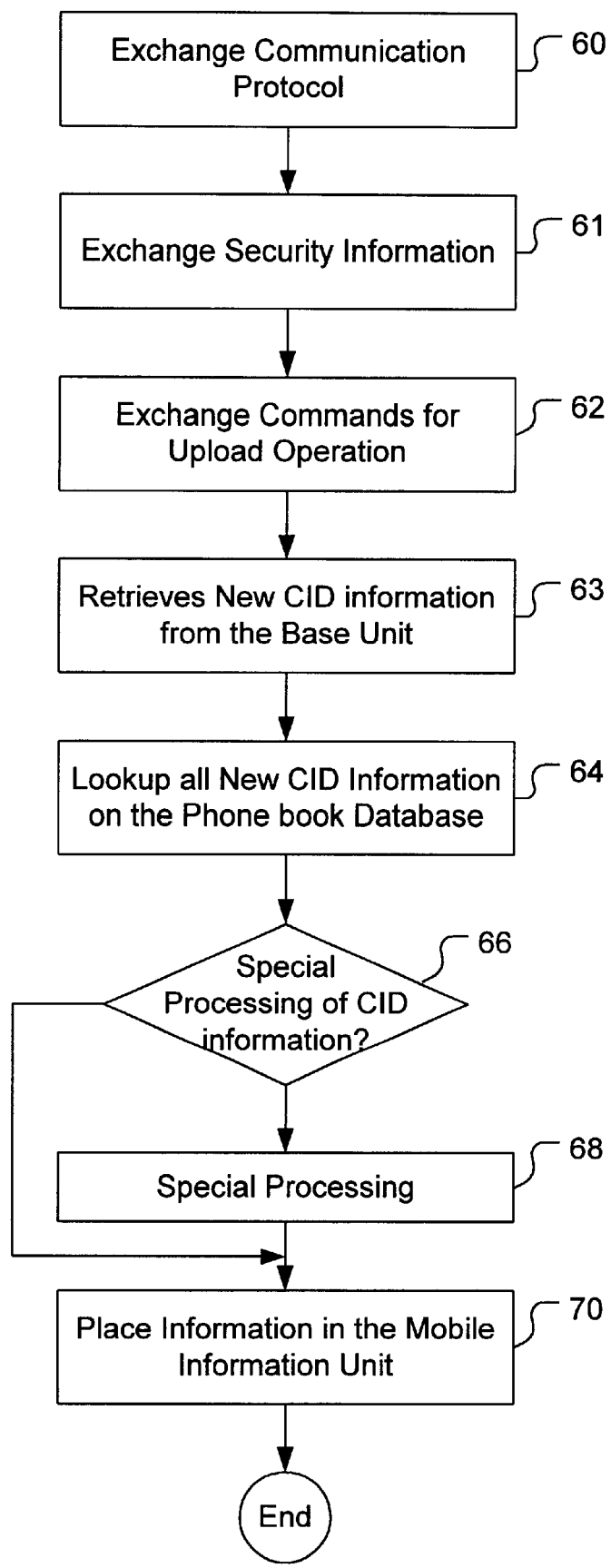
FIG. 6 is a flow chart showing the steps in establishing communication between the mobile information unit and the telecommunication base unit.

FIG. 6 is a flow chart illustrating the steps for establishing a communication link between the mobile information unit and the base unit. In the first step 60, the mobile information unit and the base unit communicate with each other and exchange the necessary communication protocol. Once the communication protocol is satisfactorily established, the mobile information unit and the base unit exchange the required security information before communication is permitted by each device 61. The security information verification method can be password verification or serial number verification. In the password verification method, clearance will be provided if each unit is programmed with the correct password. Optionally, a password can be requested from the user when the mobile information unit and the base unit are connected. In this manner, confidentiality of the information stored in the mobile information unit can still be maintained even if the mobile information unit is lost or stolen. In the serial number verification method, the serial number of the mobile information unit has to match before information will exchanged between the two devices. The security verification process can be performed by the mobile information unit or the base unit or both. Additionally, a user password can be requested as an input before information can be displayed on each unit.

Once the base unit and the mobile information unit are in communication, the mobile information unit receives an upload command from the base unit and retrieves new caller identification information and/or messages from the base unit 63. For each piece of new caller identification information a search is conducted on the phone book database in the mobile information unit 64. In the next step 66, if any special processing is required for this piece of caller identification information, it is then processed 68. Otherwise, if no special processing is required, the process flow goes directly to step 70. In this step, the information is placed in the phone book database of the mobile information unit 70 and the process ends.

A number of special processing operations can be performed on the incoming data. A particular type of special processing operation is a notification-by-category operation. In this operation, the incoming CID information is checked against the database where each entry in the database (person, company, or otherwise) is associated with a category. If the CID information is found in the database, an indicator is provided to show that the particular phone call is from an entry in a certain category. For example, if the CID information for a particular call is determined to be associated with a person in the database and the entry for this person is listed in the "friend" category, this incoming call will then be displayed as a call from someone in the "friend" category. In this manner, the calls can be prioritized accordingly and the user can quickly determine which calls to respond to first.

Figure 7:
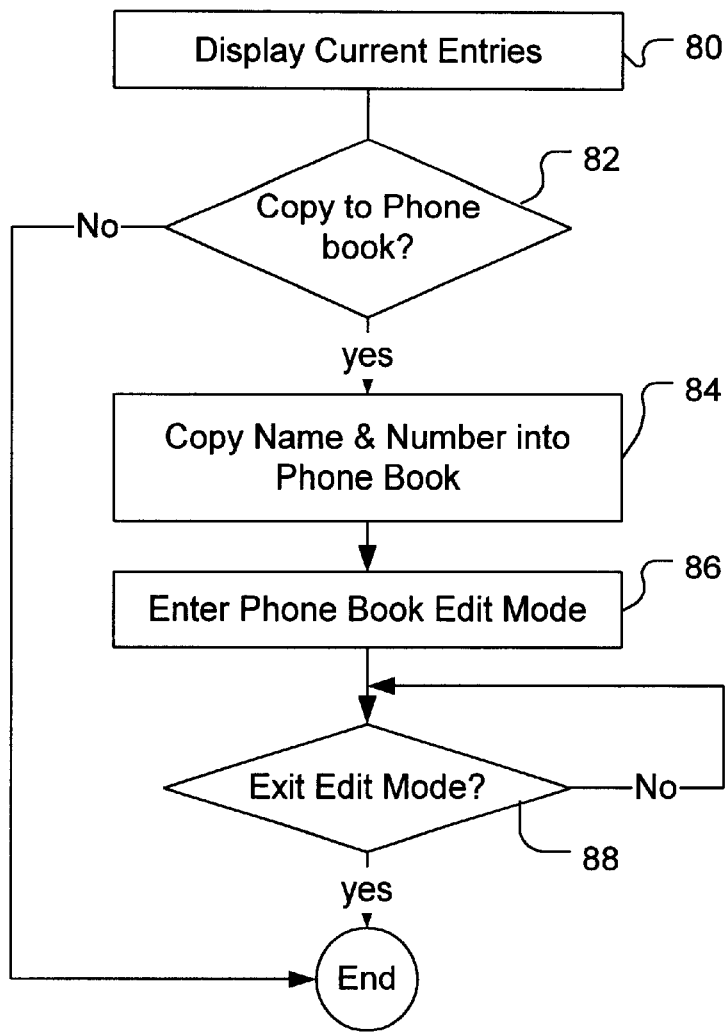
FIG. 7 is a flow chart showing the steps in copying caller identification information into a phone book.

In placing entries into the phone book, referring to FIG. 7, recently received caller identification information that is stored in the base unit is sent to and displayed on the mobile information unit. If the caller identification information is to be copied to the phone book 82, the name and number of the caller is copied into the phone book 84, otherwise this process terminates. Once a name and phone number is automatically entered into the phone book, this phone book entry can be edited 86, and the user can terminate the edit mode at any time.

Figure 8:
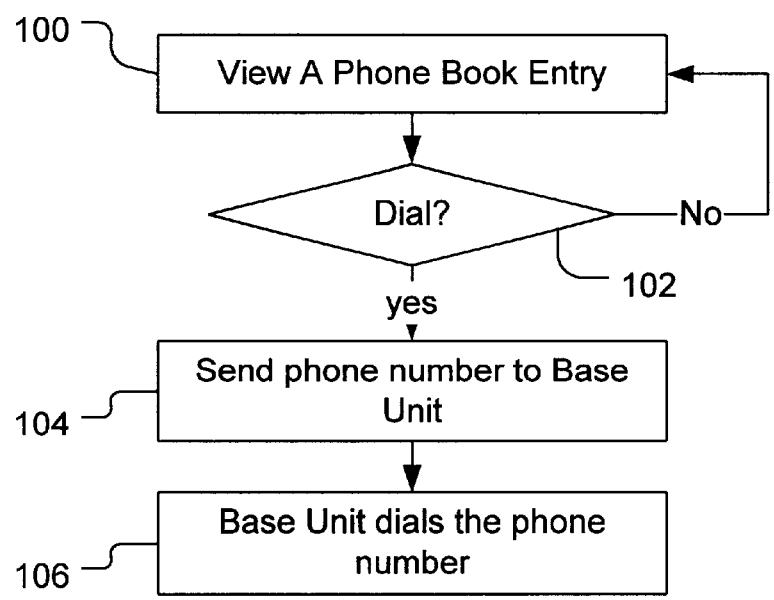
FIG. 8 is a flow chart showing the steps in using the phone number stored in the mobile information unit to cause the base unit to dial the phone number.

Caller identification log entries can be automatically entered into the phone book. Referring to FIG. 8, while the mobile information unit is in the cradle of the base unit, the mobile information unit can display one or more phone book entries 100 where an entry can be selected and the associated phone number can be dialed. Once an entry is selected to be dialed 102, the corresponding phone number in the phone book entry is sent to the base unit 104 via the connection with the base unit and the base unit dials the number 106.

Figure 9:
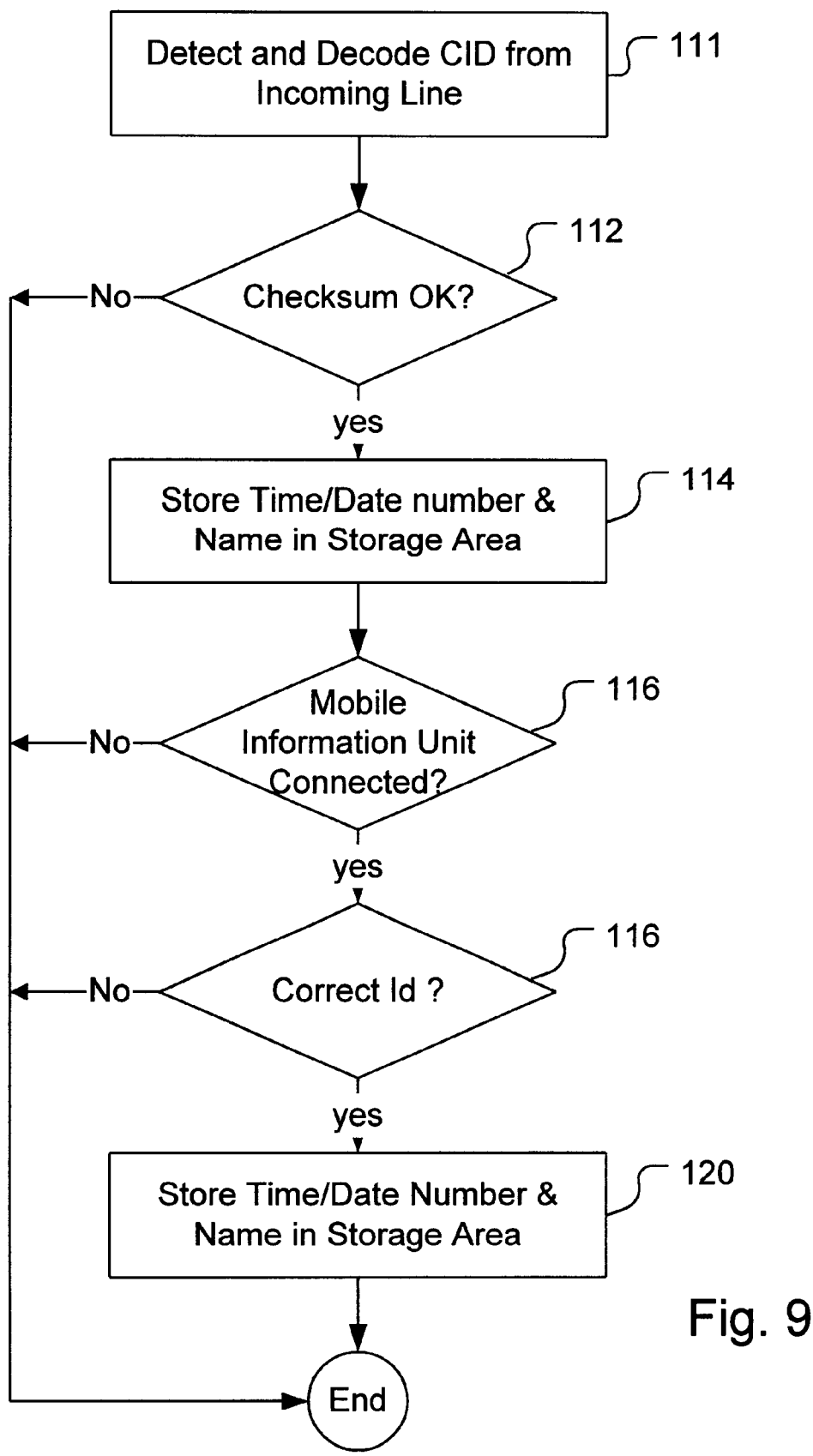
FIG. 9 is a flow chart illustrating the steps in processing caller identification information.

FIG. 9 illustrates an example of a process flow in the base unit. The base unit being connected to an incoming telephone line receives caller identification information transmitted in the incoming signal 111 where the signal is detected and decoded. This caller identification information is validated for integrity 112. If the information is valid, the information is stored in a designated storage area 114. If the mobile information unit is connected to the base unit 116, and if the mobile information unit provides the correct password to the base unit 118, the caller identification information (and/or message) is sent to the mobile information unit for display and storage 120.

In backing-up data stored in the mobile information unit, a simple command can be provided where information in the mobile information unit is transmitted to the base unit and stored. Information can also be entered into the base unit via a keyboard or via other communication methods available through the external ports—such as communication with a personal computer. If the information in the base unit has been changed, a synchronization program will automatically synchronize the information in the mobile information unit and the base unit.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

We claim:

1. A system for storing, processing and displaying information, comprising:

a mobile information unit having a first input means, a first display screen, a first storage unit for storing at least one program and a first database, a first processor, and a first plurality of contact points, said first processor operating said program in accordance with commands from said first input means to process data in said first database; and a base unit having a second processor, a second storage unit for storing a second database and at least one program, a telephone circuit for receiving an incoming phone signal and for dialing a given phone number, a caller identification circuit for receiving and decoding caller identification information, a second plurality of contact points operative for making an electrical connection with said first plurality of contact points and a display for displaying said caller identification information, said second processor operating said telephone circuit and said caller identification circuit for receiving and decoding caller identification information contained in incoming phone calls, and causing said decoded caller identification information to be transmitted to said mobile unit when said second plurality of contact points makes contact with said first plurality of contact points, said first processor processing and categorizing said caller identification information based upon information in said first database and providing notification corresponding to said categorization; and whereby upon establishing an electrical connection between said first plurality of contact points and said second plurality of contact points, a communication pathway is established between said mobile information unit and said base unit, and a security verification process is conducted before data transference is permitted between said mobile information unit and said base unit.

2. A system as recited in claim 1 wherein said base unit further includes a keypad.

3. A system as recited in claim 1 wherein said base unit further includes one or more external connectors for communicating with external devices.

4. A system as recited in claim 1 wherein the data stored in said first database is backed-up in said second database.

5. A system as recited in claim 1 wherein said first database includes phone book entries that includes names associated with phone numbers.

6. A system as recited in claim 5 wherein upon a given command the phone number of a selected phone entry is dialed.

7. A system as recited in claim 1 where said security verification process includes verification of the serial number of said mobile information unit.

8. A system as recited in claim 1 where said security verification process includes verification of the serial number of said base unit.

9. A method for storing, processing, and displaying information on a first device and a second device where said first device having a first storage unit and said second device having a second storage unit, said first device being connected to a telecommunication link, comprising the steps of:

a) receiving an incoming telephone signal containing embedded caller identification information;

b) decoding said embedded caller identification information and storing said caller identification information in said first storage unit of said first device;

c) connecting to said second device and said second storage unit of said second device;

d) verifying security information and transferring said stored caller identification information from said first storage unit to said second storage unit; and e) associating said caller identification information with one or more names from a database in said second storage unit.

10. A method as recited in claim 9 wherein each of the names is associated with a defined category.

11. A method as recited in claim 10 further including the steps of:

f) categorizing said caller identification information in accordance with said associated names; and g) displaying said categorized caller identification information and said names by category.

12. A method as recited in claim 9 further including receiving and storing of incoming voice messages in said steps a) and b).

13. A method as recited in claim 12 further including transferring of said incoming voice messages in said step d).

14. A method as recited in claim 9 further including the steps of:

f) selecting a name and an associated phone number from said second storage unit; and g) dialing said associated phone number to establish a phone connection.

15. A system for storing, processing and displaying information, comprising:

a mobile information unit having a first input means, a first display screen, a first storage unit for storing at least one program and a first database, a first processor, and a first plurality of contact points, said first processor operating said program in accordance with commands from said first input means to process data in said first database; and a base unit having a second processor, a second storage unit for storing a second database and at least one program, a telephone circuit for receiving an incoming phone signal and for dialing a given phone number, a caller identification circuit for receiving and decoding caller identification information and a second plurality of contact points operative for making an electrical connection with said first plurality of contact points; and wherein said mobile information unit communicates with said base unit via said first and second plurality of contact points and a verification process is carried out by said first processor and said second processor prior to transference of information between said mobile information unit and said base unit.

16. A system as recited by claim 15 wherein said verification process includes verification of the serial number of said mobile unit and said mobile information unit.

* * * * *